Figure 1:
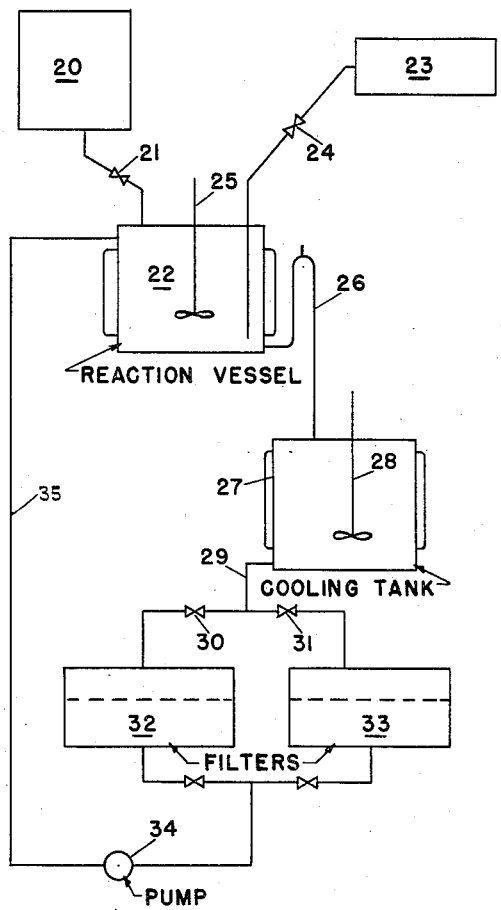

Sept. 12, 1950     A. J. COURTIER     2,521,778

PREPARATION OF THIOUREA

Filed Sept. 18, 1947

INVENTOR.
ARMAND JEAN COURTIER
BY
*Dale A. Bauer*
ATTORNEY.

Patented Sept. 12, 1950

2,521,778

UNITED STATES PATENT OFFICE 2,521,778

PREPARATION OF THIOUREA

Armand J. Courtier, Meudon, France, assignor to Societe Anonyme des Manufactures des Glaces et Produits Chimiques de Saint-Gobain, Chauny & Cirey, Paris, France Application September 18, 1947, Serial No. 774,869
In France November 4, 1946

5 Claims. (Cl. 260—552)

This invention relates to the preparation of thiourea.

A standard method of preparing thiourea known to the prior art depends upon the reaction of hydrogen sulfide on calcium cyanamide. A number of methods have been proposed for utilizing that reaction which may be divided generally into dry and wet methods. Each of these methods has its own faults. The dry methods proceed in a relatively uncontrolled manner that produces local overheating that is gravely prejudicial to the quality of the produce and to its yield. On the other hand the wet methods, while not so prone to produce degradation by local overheating, are capable of producing only dilute aqueous solutions of thiourea. Thiourea is very soluble in water, so that it requires a great expenditure of heat to evaporate the great quantity of water that must be removed if the solution is to be reduced to a volume from which the thiourea can be crystallized. Furthermore, that process has the additional drawback comprising precipitating out insoluble calcium salts produced by the decomposition of calcium cyanamide, and those salts absorb valuable products upon the filter and further reduce the yield.

It is an object of this invention to prepare thiourea economically in aqueous medium.

Another object of the invention is to crystallize thiourea from aqueous solution without the difficulty and expense of evaporating off the water.

Other objects of the invention will be in part apparent and in part set forth hereinafter.

The objects of the invention are accomplished, generally speaking, by reacting a saturated water solution of hydrogen sulfide containing an alkaline sulfide with free cyanamide, cooling and filtering the solution and using the filtrate as a reaction medium for further reactions of $H_2S$ and $CN_2H_2$.

In one form of the process the cyanamide is introduced in organic solution to the aqueous solution of alkaline sulfide and $H_2S$. In another form of the process the cyanamide is introduced in molten or in crystalline state. The processes may be carried out in a continuous or in a batch manner.

In one major form of the process, one of the reactants, cyanamide $CN_2H_2$, is employed in organic solution, preferably in a solution of the sort described in my copending application 711,844, filed November 23, 1946, with the additional requirement that the solvent itself shall not be miscible in all proportions with water. A solution of cyanamide in ethyl acetate is very useful, but other satisfactory solvents may be employed, for instance butanol, and mixtures of propanol and benzene, the benzene acting in such mixtures to lessen the solubility of the solvent. The solvent is inert to and does not chemically react with the cyanamide or the $H_2S$ with which it later comes in contact, and is an organic liquid.

The reactants, $H_2S$ and $CN_2H_2$, may be reacted in plain water medium, but that case is not preferred; it is much better to carry out the reaction at all times in the presence of alkaline sulfide.

If the reaction is carried out in plain water, it is represented by the equation:

(1)  $CN_2H_2 + H_2S \rightarrow SC(NH_2)_2$

The aqueous solution may contain ammonium sulfide or any other alkaline sulfide, but ammonium sulfide is preferred.

When an ammonium sulfide solution is employed as the reaction medium, the reaction follows the course:

(2) 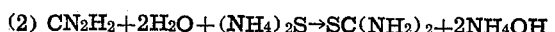 $CN_2H_2 + 2H_2O + (NH_4)_2S \rightarrow SC(NH_2)_2 + 2NH_4OH$ (3) 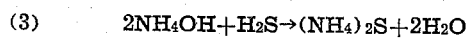 $2NH_4OH + H_2S \rightarrow (NH_4)_2S + 2H_2O$ When sufficient quantities of hydrogen sulfide and of cyanamide are employed, there is obtained under the conditions of the process a concentration of thiourea in the aqueous reaction medium such that the thiourea may be recovered in crystalline condition by simple cooling. This avoids the expense, apparatus, and labor necessary to concentrate the solution of thiourea by evaporation, which were essential to the prior art processes.

The solution of cyanamide in the organic solvent is preferably made by the method of my said copending case, a solution of cyanamide in water being passed countercurrent to a stream of organic solvent in an absorption tower, the cyanamide being stripped by the solvent from the water. The solvent may be any organic solvent for $CN_2H_2$ except those that are miscible in water in all proportions. The solution is useful as thus obtained, and it may be concentrated to any desired degree with a minimum of expense because of the volatility of the solvent. An aqueous alkaline solution which has been saturated with hydrogen sulfide is prepared to receive the cyanamide solution, and the cyanamide solution is poured in while H₂S is admitted at such a rate that the gas does not escape from the vessel. The thiourea is formed and, being very soluble, is dissolved in the aqueous medium until saturation is attained. The organic solvent, being miscible with water in some, but not in all, proportions, is dissolved until its limit of solubility is reached, after which it forms an organic layer separate from the water solution. The reaction medium thereafter constitutes an aqueous medium saturated with thiourea and the solvent. An equilibrium of concentration in cyanamide is never established between the two liquid phases, if among other things there is need to maintain the aqueous phase constantly saturated in hydrogen sulfide to continue the reaction, because cyanamide is immediately transformed to thiourea as it is dissolved in the water. It is therefore possible, according to this process of the invention, to transform an indefinite quantity of cyanamide to thiourea without increasing the volume of the aqueous phase beyond that naturally due to the accretion of volume caused by the presence of dissolved thiourea. Once the solution has become saturated with thiourea, the additional thiourea formed therein precipitates out immediately.

The temperature of the reaction may be varied but it must be recalled that thiourea tends to distintegrate at elevated temperatures, so it is advantageous to keep the temperature below 70° C. and preferably around 50° C. However, satisfactory operating conditions are obtained in the range 30 to 60° C., within which range the beneficial effect of great reactivity is realized without risking the establishment of a secondary reaction which begins to appear above 70° C. and without unduly retarding the process, as tends to occur when the temperature is reduced below 30° C.

The base employed is regenerated and freed as indicated for ammonia in the reaction (2) and serves anew for reaction (3) with the hydrogen sulfide that is constantly being introduced within the reaction medium. Consequently, the consumption of the base is at a minimum.

Thiourea is soluble in water at all temperatures, so that the mother liquor from which thiourea has been separated by crystallization remains rich in that compound and is returned to the manufacture in order to employ it again as the reaction medium. The reaction thus becomes quantitative as to yield. By the recycling, alkaline sulfide and hydrogen sulfide are recovered as well as the solvent which saturates the mother liquor.

The non-aqueous layer may be separated from the aqueous layer by decantation. This separation is preferably carried out before the filtration of the thiourea, and the solvent thus recovered is used anew for making new solutions of cyanamide, preferably by the method described in my said copending case.

The second method of carrying out the invention is based upon the discovery that the CN₂H₂ may be introduced into the saturated H₂S solution as pure cyanamide, in either crystalline or molten state. This is particularly desirable when the cyanamide is received as a shipment from which all liquids have been removed to save carrying charges, or when it has been stored dry. In using molten cyanamide the cyanamide may be kept in and drawn from a reservoir heated to about 45° C. If the crystallized cyanamide is employed it is admitted to the H₂S bath through a tube that prevents the loss of H₂S, and which is diagrammatically shown in Fig. 2.

Figure 2:
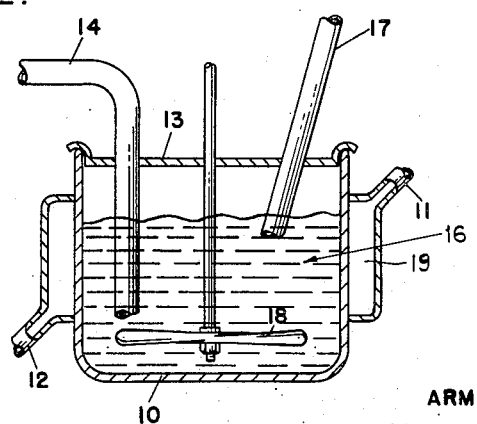

In the drawings, wherein like reference characters refer to like parts throughout the several views:

Fig. 1 is a flow sheet of a continuous process;
Fig. 2 is a diagrammatic showing of a reaction vessel designed for the admittance of pure cyanamide.

Example I 10 liters of a commercial solution of ammonia are saturated with hydrogen sulfide, care being taken that the temperature does not exceed 50° C. The quantity of hydrogen sulfide necessary may be derived from the strength of the ammonia solution and the equations hereinabove. The solution is agitated and 12 kg. of a solution of free cyanamide in ethyl acetate is brought in at a concentration of about 300 grams per liter. Simultaneously, there is brought into the solution a current of hydrogen sulfide, the rate being regulated so that no gas escapes from the reaction. By this means, there is added about 3 kg. of hydrogen sulfide. The rate at which the cyanamide solution is added should be related to the capacity of the cooling system (preferably the reaction vessel is equipped with a cooling system so that a satisfactory rate of addition may be maintained while the temperature is still kept at 45 to 50° C.). When the reaction ends agitation is stopped and the solution of ammonium sulfide and thiourea is allowed to cool. The thiourea crystallizes out. The organic layer is decanted; the aqueous layer is filtered, yielding about 30 kg. thiourea which may be purified by any known method, such as washing with alcohol.

The saline saturated solution of thiourea still contains about 4 kg. of that substance and is used again for a new operation. Being already saturated, it rejects the totality of the thiourea made during the course of the second operation so that after a certain number of recyclings, the total yield of the process becomes practically quantitative. The ethyl acetate which has served for the introduction of cyanamide is separated from the aqueous layer by decantation and may be used for the preparation of new solutions of cyanamide.

Example II

To a closed vessel fitted with an agitator and cooling means there is supplied 50 l. of a commercial solution of ammonia containing 20–30% by weight, which is saturated with H₂S gas and maintained at a temperatuhe of 45–50° C. When the solution is saturated with H₂S melted cyanamide is added to the vessel from a reservoir maintained at 45° C., while the addition of H₂S is continued. The gas is absorbed at the rate of its reaction with the cyanamide. There is thus added in one hour 20 kilos of CN₂H₂, and there is absorbed 16.2 kilos of H₂S; the temperature is held at 45–50° C.

When the reaction ends, the liquid is chilled to 15° C. and a part of the thiourea crystallizes out, about 15 kilos of thiourea being recovered by filtration. The mother liquor is returned to the reaction by the following method:

In the mother liquor in the same or a different closed vessel 10 kilos of CN₂H₂ and 8.1 kilos of H₂S are reacted; after the reaction and crystallization about 18 kilos of thiourea are recovered, and the mother liquor is returned again to serve as a reaction medium.

After the first operation there is recovered every time the quantity of thiourea corresponding to the $CN_2H_2$ and $H_2S$ put in reaction. In practice there is lost by mechanical entrainment only a trifling part of the ammonium sulfide solution. That part is compensated by the introduction of a corresponding amount of commercial ammonia solution, which is immediately saturated with $H_2S$.

An apparatus adapted for this process is shown diagrammatically in Fig. 2 of the drawing, wherein a vessel 10, provided with an encircling cooling chamber 19 having inlet and outlet 11—12 for for cooling liquid, has a hermetically sealed cover 13 through which a pipe 14 penetrates, extending near the bottom and far below the surface 15 of the liquid bath 16. A tube 17 penetrates the cover 13 and serves to admit molten or crystalline $CN_2H_2$. A stirrer 18 agitates the mixture, facilitating reaction, and keeping any undissolved thiourea in suspension.

*Example III*

The operation is carried out in an apparatus and in like manner as Example II, except that the molten cyanamide is replaced by crystalline cyanamide.

*Example IV*

This example should be read in conjunction with Fig. 1 of the drawing wherein numeral 20 indicates diagrammatically a reservoir heated to 45° C. which contains molten cyanamide which may be discharged through the vaved pipe 21 into the reaction vessel 22. A rate of discharge of 36 kilos per hour was adopted in this example. The vessel 22 contained a solution of ammonium sulfide prepared as in Example II, saturated with thiourea at a temperature of 20° C. A tank 23 holds $H_2S$ which is fed to the bottom of the vessel through valved pipe 24 at a rate of 29.2 kilos per hour. The reaction liquid in the vessel is agitated by agitator 25. The temperature of the vessel is maintained about 35° C. by a cooling system like that of Fig. 2. The solution of ammonium sulfide rich in thiourea is drawn from the vessel at a speed of 200 liters per hour by the siphon 26 into the receptacle 27 where it is kept in suspension by stirrers 28. In this receptacle the mass is cooled to about 20° C. and much of the thiourea crystallizes out. The suspension passes by pipe 29 and either valve 30 or 31 to filters 32 or 33 respectively. The filters are used alternately, one being unloaded while the other is in use. About 65 kilos of thiourea per hour are recovered in this operation.

The mother liquor, still saturated with thiourea and ammonium sulfide, passes from the filters through pump 34 and pipe 35 back to the reaction vessel.

It is possible by this invention to transform any amount of $CN_2H_2$ to thiourea without increasing the volume of the aqueous phase, and without the need to evaporate a dilute solution.

Simple cooling is sufficient to separate the thiourea by crystallization in every case.

The process is quantitative after the reaction bath is once saturated.

The reaction of $H_2S$ and $CN_2H_2$ in an aqueous alkaline medium saturated with thiourea is very valuable. The regeneration of ammonia contributes to make a continuous process of the most efficient type.

The entire process, continuous or batch, may be carried out in hermetically sealed apparatus if desired.

The thiourea obtained is of excellent quality.

This invention is particularly characterized, as to process, by the combination of steps by which the introduction of the free cyanamide is made progressively into the totality of the solution of alkaline sulfide. While the cyanamide is being introduced the solution of alkaline sulfide is kept saturated with hydrogen sulfide by a constant addition of the hydrogen sulfide gas. The cyanamide is introduced in a form such that its introduction does not substantially modify the volume of the aqueous phase and in such quantity that it forms within the aqueous phase a quantity of thiourea sufficient for recovery in crystalline state by simple chilling of the solution. Because of these novel process steps the cyanamide is always found in contact with an excess of the reactant so that secondary reactions are avoided. Under other conditions the alkaline sulfide that reacts on cyanamide to produce the thiourea will liberate the base and the liberation of the base risks the establishment of secondary reactions such as the undesirable polymerization of part of the yield to dicyandiamide. By this invention the hydrogen sulfide combines with the base liberated to become alkaline sulfide again. Because the cyanamide is introduced in such a form that the aqueous phase is not sensibly increased, regardless of the amount of cyanamide introduced, it is possible to obtain in the aqueous phase a concentration in thiourea as large as one wishes and to separate that compound by chilling. To obtain this a free cyanamide is employed in the form of a solution in a solvent that is not miscible with water in all proportions, or the cyanamide is introduced in the form of dry free cyanamide in crystalline or molten state. In the prior art the cyanamide was generally introduced in the forms of aqueous dilute solutions which reduced the concentration of the solution of thiourea obtained and made the extraction of the substance very difficult. Unless the alkaline sulfide solution is employed, the reaction is slow and the yields are inferior.

As many apparently widely different embodiments of the present invention may be made without departing from the spirit and scope thereof, it is to be understood that the invention is not limited to the specific embodiments, except as defined in the appended claims.

What is claimed is:

1. The process of making thiourea that comprises intermixing a solution of cyanamide in ethyl acetate with saturated aqueous hydrogen sulfide at a temperature below about 70° C.

2. The process of making thiourea that comprises intermixing a solution of cyanamide in an organic solvent therefor that is not miscible with water in all proportions with hydrogen sulfide and aqueous ammonium sulfide at a temperature below 70° C.

3. The process of making thiourea that comprises intermixing a solution of cyanamide in an organic solvent therefor that is not miscible with water in all proportions with hydrogen sulfide and aqueous ammonium sulfide at a temperature about 50° C. with agitation.

4. The process of making thiourea that comprises intermixing a solution of cyanamide in ethyl acetate with hydrogen sulfide and aqueous ammonium sulfide at a temperature about 50° C. with agitation.

5. A method of preparing thiourea that comprises saturating 10 liters of commercial aqueous ammonia with $H_2S$ at 50° C., admitting 12 kilos of cyanamide in ethyl acetate at 300 g./l., adding $H_2S$ at a rate such that there will be no escape of gas, cooling the mass, and isolating thiourea.

ARMAND J. COURTIER.

REFERENCES CITED

The following references are of record in the file of this patent:

UNITED STATES PATENTS

| Number | Name | Date |
|---|---|---|
| 1,298,159 | Bennett | Mar. 25, 1919 |
| 1,991,852 | Heuser | Feb. 19, 1935 |
| 2,173,067 | Roblin | Sept. 12, 1939 |
| 2,337,882 | Gajewski | Dec. 28, 1943 |

FOREIGN PATENTS

| Number | Country | Date |
|---|---|---|
| 260,061 | Germany | May 13, 1913 |
| 452,025 | Germany | Nov. 1, 1927 |
| 683,110 | France | Feb. 24, 1930 |
| 336,111 | Great Britain | Oct. 9, 1930 |